United States Patent [19]

Finley et al.

[11] 4,000,874
[45] Jan. 4, 1977

[54] WIRING DEVICE WITH REMOVABLE FINGER PORTION

[75] Inventors: Richard James Finley, Camp Hill; Warren David Nauman, Elizabethtown, both of Pa.

[73] Assignee: AMP Incorporated, Harrisburg, Pa.

[22] Filed: Jan. 29, 1975

[21] Appl. No.: 545,242

[52] U.S. Cl. .............................. 248/27.1; 174/58; 220/3.9; 248/DIG. 6
[51] Int. Cl.² ......................................... H02G 3/08
[58] Field of Search ............ 248/27, DIG. 6, 205 R; 220/3–9, 3.5, 3.6; 174/53, 58

[56] References Cited

UNITED STATES PATENTS

| 1,961,728 | 6/1934 | Arnest et al. | 220/3.9 |
| 2,401,948 | 6/1946 | Loy | 248/DIG. 6 |
| 2,430,067 | 11/1947 | Loy | 220/3.6 |
| 2,788,187 | 4/1957 | Cookson et al. | 248/27 |
| 3,481,572 | 12/1969 | Casebolt et al. | 52/100 X |
| 3,596,860 | 8/1971 | Mackay | 220/3.9 X |

Primary Examiner—J. Franklin Foss
Attorney, Agent, or Firm—Gerald K. Kita

[57] ABSTRACT

A wiring device is disclosed of the type having a dielectric housing portion into which the individual conductors of a multi-conductor cable are electrically connected. The housing portion is encircled by a mounting bracket suitable for stud or bracket mounting and convertible to wallboard mounting by, first removing a frangible finger portion of the bracket and then assembling the finger portion over a corner portion of the bracket by a threaded fastener. The wiring device is then inserted in a wallboard opening from the front side. The fastener is turned and the finger is pivoted on the fastener until it projects outwardly of the wiring device. Continued turning of the fastener advances the finger therealong into gripped engagement on the back side of the wallboard, mounting the wiring device securely to the wallboard.

3 Claims, 8 Drawing Figures

U.S. Patent  Jan. 4, 1977  Sheet 1 of 2  4,000,874
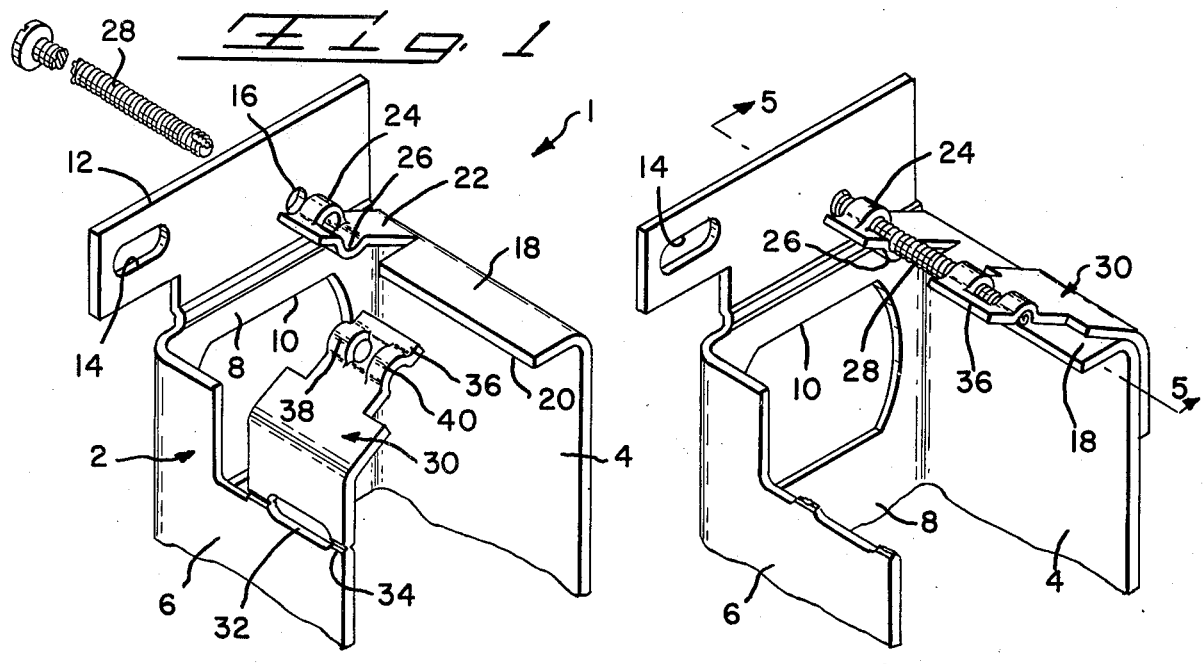
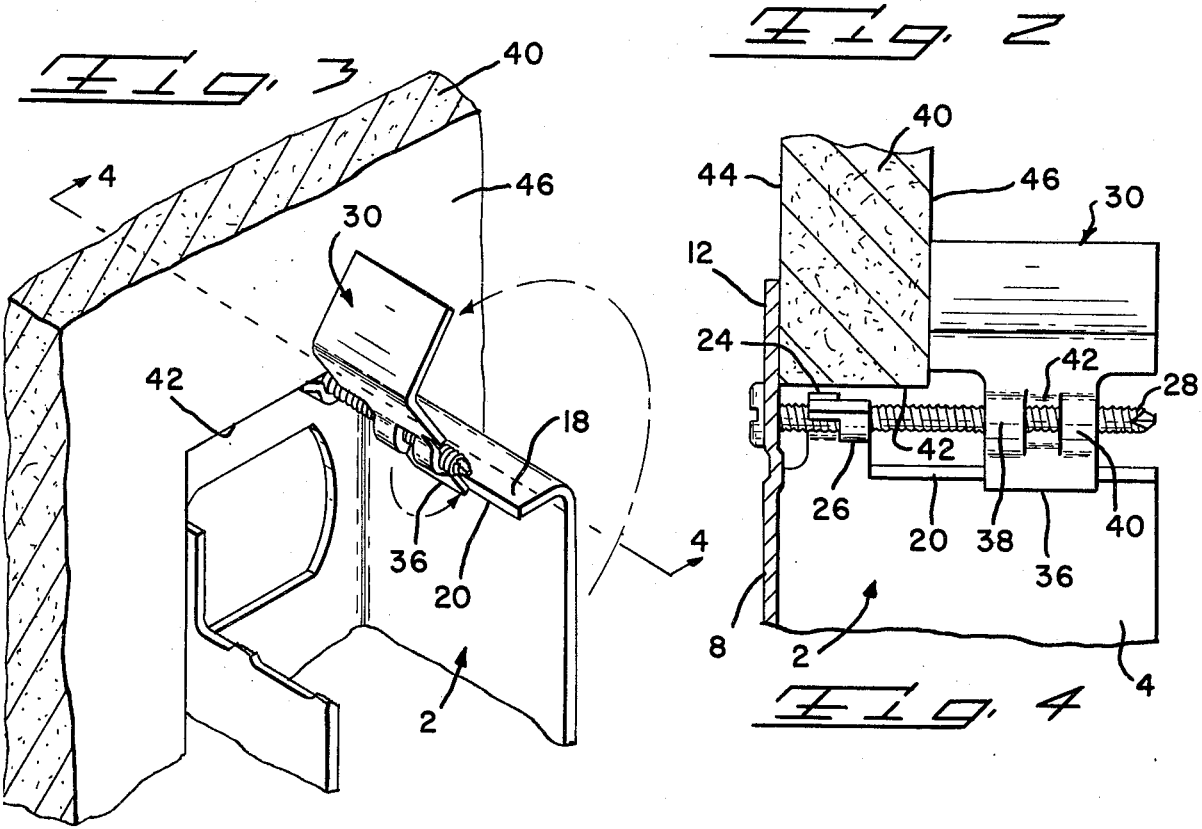
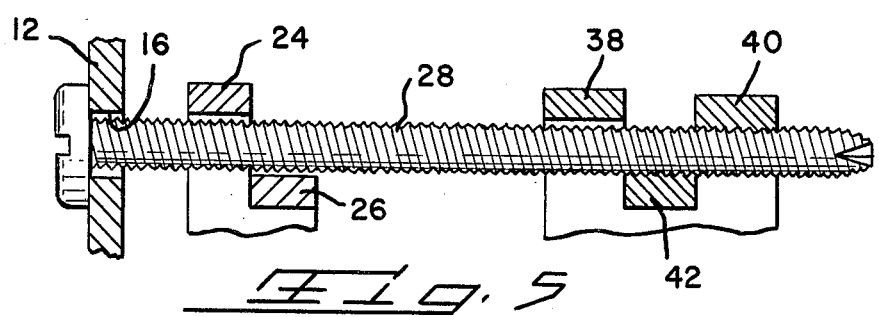

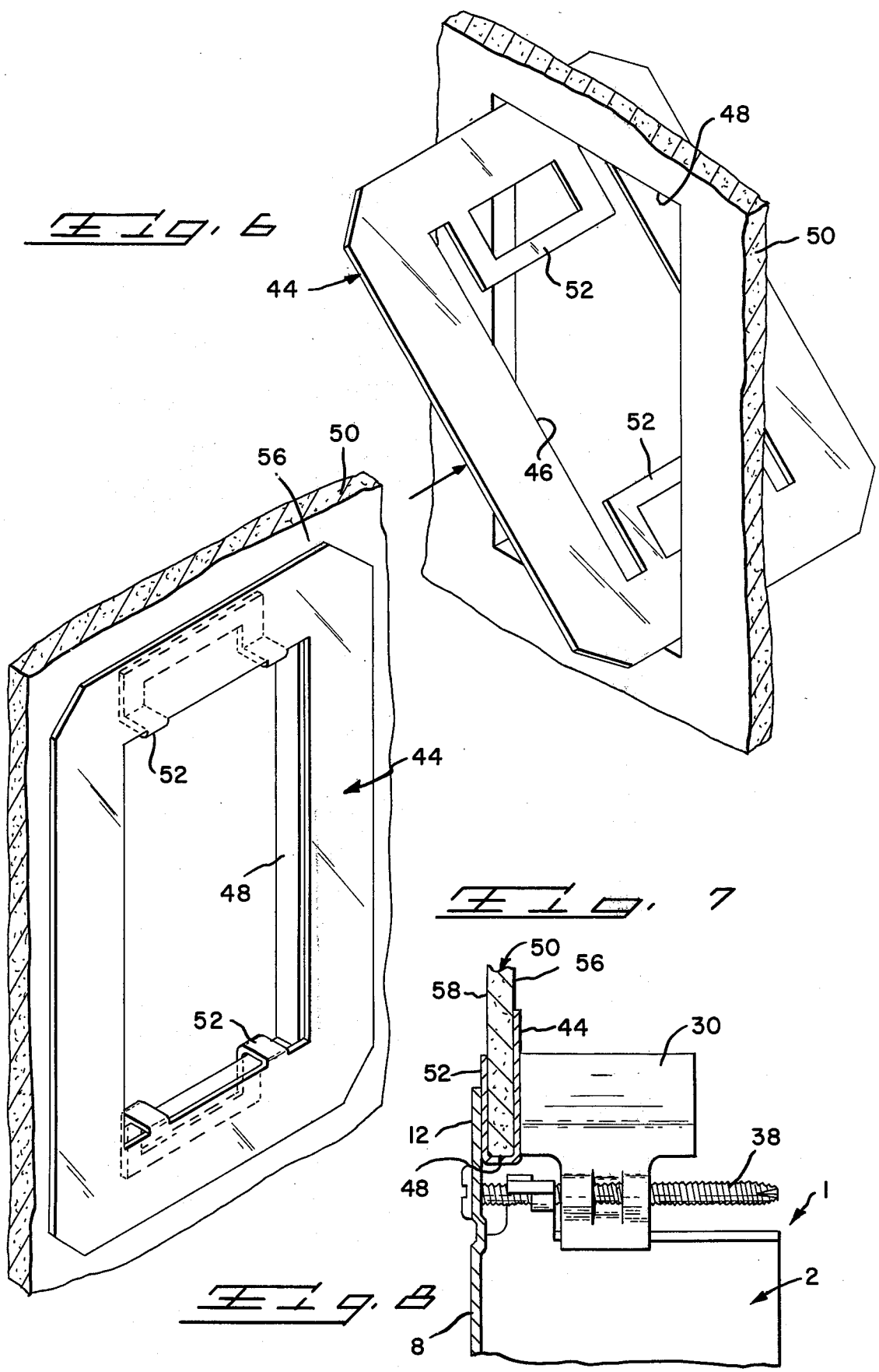

WIRING DEVICE WITH REMOVABLE FINGER PORTION

BACKGROUND OF THE PRIOR ART

There has been a long existing need in the prior art for a wiring device of the housewiring type which can be installed by mounting against a stud or alternatively in an opening of a wallboard where a stud is not present. There have been various structures in the prior art which accomplish wallboard mounting. One example involves a two-piece wiring device wherein a first portion is located in a wallboard opening from the front side of the wallboard and a second portion is assembled to the first portion from the back side of the wallboard. In another exemplary structure, a wiring device is inserted into a wallboard opening from the front side wherein deformable or pivotable portions on the back side of the wiring device are spread outwardly into registration with the back side of the wallboard. In such structures it is necessary for an installer to have access to the back side of a wallboard such that installation operations can be performed. Often, however, access to the back side of a wallboard is not available, for example wherein replacement of a defective or worn wiring device would require damage to the wallboard in order to obtain access to the back side thereof. Often it is desirable to install an additional wiring device to a wiring system already installed behind a wallboard. Under such a situation it would be advantageous to install a wiring device which is structured and designed to eliminate the need for access to the back side of the wallboard.

BRIEF DESCRIPTION OF THE PRESENT INVENTION

To fulfill a need in the prior art, the present invention comprises a wiring device which is suitable for stud mounting and which is quickly convertible or adaptable to mounting in a wallboard opening without a need for access to the wallboard reverse side or back side.

Another object of the present invention is to provide a wiring device suitable for assembly in a wallboard opening with portions of the device capable of adjustment into gripped relationship across the thickness of the wallboard.

Another object of the present invention is to provide a wiring device having a bracket with a profile suitable for insertion into a minimal sized opening of a wallboard from the front side thereof with portions of the bracket capable of displacement outwardly of the profile and then advancement along a fastener into gripped engagement on the back surface or reverse surface of the wallboard.

Another object of the present invention is to provide a wiring device with a bracket having a removable portion capable of assembly on a threaded fastener in close proximity to the profile of the bracket, first to permit insertion of the bracket in a wallboard opening and to permit pivoting of the removable portion on the fastener outwardly of the profile for advancement along the fastener into gripped engagement against the reverse or back surface of the wallboard.

Another object of the present invention is to provide a bracket which is convertible to a wallboard mounting structure by removal of a finger portion of the bracket and assembly of the finger portion on a threaded fastener whereby the finger portion may be pivoted outwardly of the profile and advanced along the fastener into gripped engagement on the wallboard.

Another object of the present invention is to provide a bracket with a removable portion which is assembled on a threaded fastener to provide a gripping finger projecting outwardly of the bracket profile, and which finger may be advanced along the fastener into gripped engagement on a reverse surface of a wallboard whereby any tendency of the finger to pivot by vibration or gravitation tends to tighten it against the wallboard and wherein any such tendency of the finger to pivot is resisted by a positive stop of the finger against an appropriate portion of the bracket.

Other objects and many attendant advantages of the present invention will become apparent upon perusal of the following detailed description taken in conjunction with the accompanying drawings wherein:

FIG. 1 is a fragmentary perspective with parts in exploded configuration illustrating the details of a bracket of a wiring device according to the present invention.

FIG. 2 is a fragmentary perspective of the bracket shown in FIG. 1 with selected parts of the bracket relocated and assembled to the remainder of the bracket by a threaded fastener in such a fashion to permit insertion of the bracket within an opening of a wallboard from the front side or obverse side thereof.

FIG. 3 is a fragmentary perspective of the bracket as shown in FIG. 2 assembled in a wallboard opening with a removable portion of the bracket displaceable outwardly of the profile of the bracket and displaceable into gripped relationship against the back surface or reverse surface of the wallboard.

FIG. 4 is a fragmentary enlarged section taken along the line 4—4 of FIG. 3.

FIG. 5 is an enlarged section taken along the line 5—5 of FIG. 2.

FIG. 6 is a fragmentary perspective of an auxiliary reinforcement plate being inserted within the confines of a wallboard opening.

FIG. 7 is an enlarged fragmentary perspective of the reverse surface of a wallboard with the plate shown in FIG. 6 being illustrated in assembled relationship within the wallboard opening.

FIG. 8 is a fragmentary elevation in section of the wiring device illustrated in FIG. 4 mounted together with the reinforcement plate in the wallboard opening which is shown in FIG. 7.

DESCRIPTION OF THE PREFERRED EMBODIMENTS

With more particular reference to the drawings there is shown generally at 1 in FIG. 1 a portion of a bracket of a wiring device, for example, of the type disclosed in U.S. Pat. No. 3,860,739, Ser. No. 300,931, filed Oct. 26, 1972. Such a wiring device comprises any type having a dielectric housing portion which is not illustrated in order to specifically illustrate the details of the bracket 1. The wiring device which comprises the housing and the partially encircling bracket 1 is of the type for example wherein individual conductors of a multiconductor electrical cable are electrically connected within the housing portion without a need for severing individual conductors; with the exception that wherein the wiring device is a switch, only one of the conductors is purposely severed to allow for circuit interruption by the switch. More specifically, in a typical wiring device such as that disclosed in the referenced patent, the individual conductors of the cable are separated by slicing the cable sheath, the conductors are spread apart; and in the case of the switch one of the conductors is severed. The conductors are then located within the housing portion of the particular wiring device desired and a cover portion of the housing portion is pressed into place automatically connecting electrically the wires to the electrical contacts of the wiring device and enclosing the connected wires internally of the wiring device housing portion. The wiring device is then ready for installation in a wallboard opening, for example. If the wiring cable is already in place behind a wallboard, an opening may be cut into the wallboard to expose the wires. The wires are then pulled through the opening to the front side of the wallboard. The wires then are prepared by slicing through the cable sheath and spreading apart portions of the wires. Connection of the wires electrically to the wiring device is accomplished according to the teachings of the patent above referenced, leaving the wiring device suitable for mounting in the wallboard opening cut to expose the wiring cable. In the present invention, the bracket 1 is advantageously stamped and formed from sheet metal and includes a body portion 2 which is formed into a generally box-shaped profile configuration in order to partially encircle the correspondingly shaped profile of the dielectric housing portion of a wiring device as described. The body portion 2 includes opposed side portions 4 and 6 connected by a transversely extending web portion 8. As shown the web portion 8 is provided with a stamped out opening 10 which corresponds to the shape of the well-known outlet receptacle of a wiring device of the type used in housewiring. If the dielectric housing portion to which the bracket 1 is associated is a switch, a junction box or other type of wiring device, the opening 10 will have alternative shapes corresponding to the wiring device type. Each end of the web portion 8 further includes an outwardly projecting planar flange portion, one of which is shown at 12. The other end is not shown to simplify the drawings. Each flange 12 projects laterally and outwardly beyond the profile of the body portion 2 and is generally coplanar with the web portion 8. Each flange portion 12 includes a pair of spaced apertures 14 and 15 which are fastener alignment holes to permit securing each flange portion 12 to a mounting surface of any desired type. For example, in a typical application the wiring device comprising the dielectric housing and encircling bracket is mounted in a recess of a wallboard and each flange 12 seats against the front surface or obverse surface of the wallboard. If the wallboard is of sufficient composition or material, threaded fasteners or other suitable fasteners may be aligned and received in the alignment apertures 14 and 16 to connect the bracket 1 directly to the wallboard. Alternatively each flange 12 may be secured by fasteners to a rigid plate or additional bracket (not shown) as well as directly to a wallboard stud. It is often the case however that a wallboard to which it is desired to mount wiring devices is fabricated from Gypsum or other materials not suitable for anchoring or securing fasteners thereto. In addition, it is often desirable to add a wiring device to a wiring system already installed behind a finished wallboard without substantial reconstruction of the wallboard and where there is no reasonable access to the reverse or back surface of the wallboard. Accordingly the opposite ends of the bracket 1 includes similar structure convertible to or adaptable for mounting in a wallboard opening without a need for access to the reverse side of the wallboard. For clarity only one end of the bracket will be explained in detail, the other end being similar. The bracket includes a corner portion 18 formed integral with the corresponding side portion 4 and provided with an elongated edge margin 20 for a purpose to be described hereinafter. The bracket is additionally provided with a diagonally projecting tab portion 22 formed integral with the side portion 4 and having oppositely recessed arcuate portions 24 and 26 which are in tandem alignment with each other and also with opening 16 of the flange portion 12. The recesses 24 and 26 together provide a fastener alignment means; the aperture or opening 16 of the flange 12 providing the second fastener alignment means. Accordingly as shown in FIG. 5 a threaded elongated fastener 28 may be freely inserted through the aperture 16 and in the space between the portions 24 and 26 thereby aligning the fastener for a purpose to be described. As shown in FIGS. 1 and 2, the sidewall portion 6 includes a finger portion 30 thereon which is partially bent to provide a corner portion of the bracket 1. The finger portion 30 is adapted for removal from the sidewall portion 6 and thereby is provided with an elongated slotted portion 32 and a scored groove 34 intercepting the slot 32. The free end 36 of the finger portion 30 is provided with a pair of spaced arcuate recessed portions 38 and 40 with an oppositely recessed portion 42 therebetween. The finger portion 30 is advantageously removed for converting the bracket or adapting the bracket for mounting in a wallboard opening. This is first accomplished by inserting a screwdriver or other suitable tool into the slot 32 and forcibly separating the finger 30 from the sidewall 6. The finger 30 is frangible along the slotted portion 32 and the scored portion 34. As shown in FIGS. 2 and 5, the corner bent configuration of the finger portion 30 is assembled over the portion 18 and 4 of the bracket with the arcuate portions 38, 42, and 40 in alignment with the fastener alignment means 24 and 26. This permits the threaded fastener 28 to be threadably driven into the vicinity between the arcuate portions 38 and 42 and into the vicinity between the arcuate portion 40 and 42. As shown in FIG. 5 the arcuate portions 38 freely receives the fastener 28 therethrough and accordingly provides a third fastener alignment means. The tandem arcuate portions 40 and 42 are laterally spaced apart a distance less than the diameter of the threaded portion of the fastener 28 requiring the fastener to cut threadably its way through the areas between the arcuate portions 40 and 42. The finger 30 thereby is threadably secured to the fastener by virtue of the threaded connection established by the fastener cutting threads into both the arcuate portions 40 and 42. With the finger portion 30 assembled and secured threadably on the threaded fastener 28 in close proximity and in overlapped conformity with the profile of the bracket portions 18 and 4, the bracket is freely insertable through a wallboard opening as shown in FIG. 3. For example, a wallboard 40 is provided with a wallboard opening 42 which is larger than the profile of the bracket portion 4 but is smaller than the outer extended flange portions 12. The body portion 2 of the bracket accordingly is freely insertable into the wallboard opening 42 from the obverse side or front side 44 of the wallboard 40, with the flange portions 12 being stopped against the obverse surface 44 to limit insertion of the bracket body portion 2. As shown in FIGS. 3 and 4, the finger portion 30 which is assembled to the threaded fastener as described is accordingly positioned behind the wallboard reverse surface or back surface 46. Rotating the threaded fastener 28 by a screw driver, for example, causes the finger to pivot about the threaded fastener 28 as an axis to an outwardly extended or projecting position as shown in FIG. 8. The pivoted finger 30 accordingly projects substantially outward of the profile of the body portion 2 of the bracket. The free end 36 is pivoted as shown in FIG. 3 until it registers in stopped engagement against the edge margin 20 of the corner portion 18 of the bracket thereby maintaining in its outwardly projected position. Continued rotation of the threaded fastener 28 will cause the finger 30 to threadably advance along the fastener until it engages the back surface 46 of the wallboard 40 as shown in FIG. 4. The threaded fastener may be turned additionally a few turns to bear the finger 30 in gripped engagement against the back surface 46 of the wallboard 40 whereby the wallboard is gripped or clamped between the finger 30 and the flange portion 12 to securely mount the bracket to the wallboard in a recessed position within the wallboard opening 42. The bracket accordingly may be securely mounted recessed within a wallboard opening without a need for access to the reverse surface 46 of the wallboard 40. This accordingly permits mounting of a wiring device which incorporates the bracket within a wallboard opening of limited dimensions without a need for destruction of the wallboard and without a need for access to the reverse surface of the wallboard. The bracket as described is suitable for stud mounting, for mounting directly on a bracket or for mounting directly within a wallboard opening. The finger 30 advanced along the fastener 28 is accordingly adjustable to grip a wallboard of any desired thickness.

As shown the finger 30 is cantilevered such that it has a tendency to continue pivotal motion under the action of gravity or vibration. Such action will have a tendency to insure a more positive stop against the portion 20 and to advance along the threaded fastener for increased gripped engagement on the wallboard.

With reference to FIGS. 6, 7, and 8, a further feature of the present invention will be described in detail. Often there exists the case where a wallboard in which a wiring device incorporating the bracket 1 of the present invention is very thin or is structurally weak. Accordingly the present invention incorporates a reinforcement bracket illustrated generally at 44. The bracket 44 is the form of a reinforcement plate having a central opening 46 of similar dimension to that of an opening 48 of a wallboard 50. The plate 44 further includes a pair of tab portions 52 which are of relatively thin U-shaped configuration to allow deformation thereof by bending. As shown in FIG. 6 the reinforcement plate is freely insertable diagonally within the wallboard opening 48 the plate 44, and then manually positioned to lie against the reverse surface 56 of the wallboard 50 with the tab portions 52 being readily bent to bridge across the thickness of the wallboard 50 at opposite ends of the wallboard opening and to overlie against the front surface or obverse surface 58 of the wallboard 50. Accordingly the plate 44 may be inserted and assembled in the wallboard opening completely from the obverse side 58 thereof without a need for access to the reverse side of the wallboard. The plate 44 provides reinforcement such that when a wiring device incorporating the bracket 1 is assembled in the wallboard opening 48, the flange 12 and the finger portion 30 will grippingly engage therebetween, the bracket portions 44 and 52 which overlie and reinforce the wallboard surfaces 56 and 58. Thus if the wallboard thickness is very thin or is weak, the bracket portions 52 and 44 reinforce the wallboard to permit secure gripping attachment of the bracket within the wallboard opening.

Although preferred embodiments of the present invention have been described in detail other embodiments and modifications which will be apparent to one having ordinary skill in the art are intended to be covered by the spirit and scope of the appended claims.

What is claimed is:

1. A wiring device, comprising: a wire receiving portion, a bracket having a projecting portion engageable on an obverse surface of a wallboard, a finger portion of said bracket being initially assembled in close conformity with the periphery of said bracket to allow insertion of said bracket into an opening of a wallboard, said finger portion being pivotable by a threaded fastener to project outwardly beyond the periphery of said bracket, said finger portion being capable of advancement along said fastener into engagement against a reverse surface of a wallboard whereby the wallboard is gripped between said projecting portion and said finger portion to mount said wiring device in said wallboard opening, stop means provided on said bracket, said finger portion being pivotable into engagement against said stop means to project outwardly beyond the periphery of said bracket, said finger portion being capable of advancement along said fastener while engaged against said stop means, and said finger portion including a first fastener alignment portion freely receiving said fastener therethrough and a fastener securing portion adjustably secured to said fastener, said bracket having a projecting ear provided with a second fastener alignment portion.

2. A wiring device, comprising: a wire receiving portion, a bracket having a projecting portion engageable on an obverse surface of a wallboard, a finger portion of said bracket being initially assembled in close conformity with the periphery of said bracket to allow insertion of said bracket into an opening of a wallboard, said finger portion being pivotable by a threaded fastener to project outwardly beyond the periphery of said bracket, said finger portion being capable of advancement along said fastener into engagement against a reverse surface of a wallboard whereby the wallboard is gripped between said projecting portion and said finger portion to mount said wiring device in said wallboard opening, stop means provided on said bracket, said finger portion being pivotable into engagement against said stop means to project outwardly beyond the periphery of said bracket, said finger portion being capable of advancement along said fastener while engaged against said stop means, said bracket including oppositely arcuate recessed portions tandemly aligned in directions toward and away from said projecting portion and defining a first fastener alignment means spaced from said projecting portion, said finger portion including a first arcuate portion freely receiving said fastener and defining a second fastener alignment means, and said finger portion including tandem and oppositely arcuate second portions for secured engagement on said fastener and defining a fastener securing means.

3. A wiring device, comprising: a wire receiving portion, a bracket having a projecting portion engageable on an obverse surface of a wallboard, a finger portion of said bracket being initially assembled in close conformity with the periphery of said bracket to allow insertion of said bracket into an opening of a wallboard, said finger portion being pivotable by a threaded fastener to project outwardly beyond the periphery of said bracket, said finger portion being capable of advancement along said fastener into engagement against a reverse surface of a wallboard whereby the wallboard is gripped between said projecting portion and said finger portion to mount said wiring device in said wallboard opening, stop means provided on said bracket, said finger portion being pivotable into engagement against said stop means to project outwardly beyond the periphery of said bracket, said finger portion being capable of advancement along said fastener while engaged against said stop means, and said finger portion in engagement against said stop means projecting outwardly of said threaded fastener and being acted upon by gravity to pivot in a direction so as to advance along said threaded fastener.

* * * * *